United States Patent
Schmidt et al.

(10) Patent No.: US 6,598,093 B1
(45) Date of Patent: Jul. 22, 2003

(54) METHOD AND APPARATUS FOR A CORE APPLICATION PROGRAMMING INTERFACE

(75) Inventors: Jeffrey A. Schmidt, Boulder Creek, CA (US); Bernard A. Traversat, San Francisco, CA (US); Thomas Saulpaugh, San Jose, CA (US); Gregory L. Slaughter, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/079,102

(22) Filed: May 14, 1998

(51) Int. Cl.[7] .................................................. G06F 9/46
(52) U.S. Cl. ................... 709/328; 709/315; 707/103 Z; 707/1
(58) Field of Search ................................. 709/328, 310, 709/315, 316; 707/1–10, 103 R, 103 Y, 103, 103 Z

(56) References Cited

U.S. PATENT DOCUMENTS

| | | | | |
|---|---|---|---|---|
| 5,732,261 A | * | 3/1998 | Savitzky et al. | 707/103 R |
| 5,765,039 A | * | 6/1998 | Johnson | 709/328 |
| 5,838,965 A | * | 11/1998 | Kavanagh et al. | 707/103 R |
| 5,857,197 A | * | 1/1999 | Mullins | 707/103 R |
| 5,966,707 A | * | 10/1999 | Van Huben et al. | 707/10 |
| 6,085,198 A | * | 7/2000 | Skinner et al. | 707/103 R |
| 6,101,607 A | * | 8/2000 | Bachand et al. | 713/201 |
| 6,173,439 B1 | * | 1/2001 | Carlson et al. | 717/108 |
| 6,212,575 B1 | * | 4/2001 | Cleron et al. | 709/328 |

OTHER PUBLICATIONS

"JDBC Guide: Getting Started". Sun Microsystems, Inc. Mar. 1997.*
"ObjectStore Component Server Framework User Guide". Object Design, Inc., Mar. 1998.*

* cited by examiner

*Primary Examiner*—Alvin Oberley
*Assistant Examiner*—Lewis A. Bullock, Jr.
(74) *Attorney, Agent, or Firm*—Beyer Weaver & Thomas, LLP

(57) ABSTRACT

Methods and apparatus for implementing a core application programming interface which is a part of more than one application programming interface are disclosed. According to one aspect of the present invention, a class structure in an object based system is arranged to provide application programming interfaces which enable access to a system database. The class structure includes a first set of classes that define a core application programming interface, a second set of classes that define a client application programming interface, and a third set of classes that define a server application programming interface. The second set of classes includes the first set of classes, and the third set of classes includes the second set of classes. In one embodiment, the first set of classes includes interfaces.

17 Claims, 6 Drawing Sheets

METHOD AND APPARATUS FOR A CORE APPLICATION PROGRAMMING INTERFACE

CROSS-REFERENCE TO RELATED APPLICATIONS

This application is related to U.S. patent application Ser. No. 09/079,042 U.S. Pat. No. 6,351,751 filed on May 14, 1998, entitled "PERSISTENT STORAGE MANAGERS FOR CONFIGURATION CLIENT/SERVER ENVIRONMENTS;" U.S. patent application Ser. No. 09/079,501 U.S. Pat. No. 6,161,125 filed on May 14, 1998, entitled "A GENERIC SCHEMA FOR STORING CONFIGURATION INFORMATION ON A CLIENT COMPUTER;" U.S. patent application Ser. No. 09/079,103 U.S. Pat. No. 6,233,582, filed on May 14, 1998, entitled "PERSISTENT STORAGE INTERFACE FOR A CONFIGURATION OBJECT-BASED SYSTEM;" U.S. patent application Ser. No. 09/079,499 U.S. Pat. No. 6,119,157, filed on May 14, 1998, entitled "A PROTOCOL FOR EXCHANGING CONFIGURATION DATA IN A COMPUTER NETWORK;" and U.S. patent application Ser. No. 09/079,500 U.S. Pat. No. 6,052,720 filed on May 14, 1998, entitled. "A GENERIC SCHEMA FOR STORING CONFIGURATION INFORMATION ON A SERVER COMPUTER;" and U.S. Provisional Application No. 60/085,425, filed on May 14, 1998, entitled "JAVA SYSTEM DATABASE," which are all incorporated herein by reference.

BACKGROUND OF THE INVENTION

1. Field of Invention

The present invention relates generally to methods and apparatus for providing application programming interfaces in computer systems. More particularly, the present invention relates to a core application programming interface suitable for use by different application programming interfaces in a computing system.

2. Description of the Related Art

The use of networked computing systems is increasing as the use of personal computers is becoming more prevalent. By networking, or otherwise linking, computer systems together, resources such as software applications may be shared by multiple users, i.e., computer systems. The sharing of resources over a network generally enables each networked user to more efficiently utilize and allocate resources that are local to the user.

In an effort to consolidate resources in a networked computing system, network computers are being developed. Such network computers are typically used as clients within a network. Network computers are generally systems which are arranged to access and operate using mostly remote databases and resources, which are often servers on the network. Typically, a platform such as a network computer does not have local access to a writable storage device, e.g., a disk drive. As such, a user who uses a network computer may access and store information on a remote database that is shared by any number of users. As a result, it is not necessary for the network computer to, for example, have significant writable local storage capabilities.

The interfaces, e.g., application programming interfaces (APIs), associated with allowing applications, or entries, to be published on and retrieved from a shared database often include a relatively large number of methods. For example, a group of methods are typically needed to allow a client to publish entries to, search for entries on, and retrieve entries from a shared database. Similarly, a group of methods are generally needed to allow a server to publish entries to, search for entries on, and retrieve entries from a shared database.

Resources needed to provide the methods used to publish entries, search for entries, and retrieve entries may be significant. Specifically, keeping the functionality associated with a client API and the functionality associated with a server API on a system database may require a substantial amount of resources on the system database. In general, some of the methods associated with a client API and the methods associated with a server API are common. That is, some methods are the same irregardless of whether they are implemented with respect to a client or implemented with respect to a server. Therefore, essentially separately maintaining the functionality for a server API and a client API may be inefficient as it may be difficult to maintain consistency of use and function of the relevant methods.

A method is typically associated with a specific class or interface. Classes and interfaces are arranged in hierarchies, i.e., class hierarchies. In particular, classes and interfaces that are associated with a client API are part of one hierarchy, while classes and interfaces that are associated with a server API are part of another hierarchy. Hence, in some cases, the same class type may be associated with two different class hierarchies. Such redundancy in class type, like redundancy in methods, may be undesirable in terms of maintaining consistency of use and consistency in the functions of the classes.

As such, what is desired is a method and an apparatus for efficiently organizing class hierarchies and APIs on a system database. Specifically, what is desired is a method and an apparatus for developing a core API and, hence, a class hierarchy, for use with a system database such that resources may be efficiently used on the system database.

SUMMARY OF THE INVENTION

The present invention relates generally to defining a class hierarchy which allows a core application programming interface to be defined within an object based system. According to one aspect of the present invention, a class structure in an object based system is arranged to provide application programming interfaces which enable access to a system database. The class structure includes a first set of classes that define a core application programming interface, a second set of classes that define a client application programming interface, and a third set of classes that define a server application programming interface. The second set of classes includes the first set of classes, and the third set of classes includes the second set of classes. In one embodiment, the first set of classes includes interfaces. In such an embodiment, the interfaces may include an Entry interface.

In another embodiment, the first set of classes includes at least one abstract class and at least one concrete class. When the first set of classes includes abstract classes and concrete classes, the abstract class may include a BaseEntry class, while the concrete class may include a SystemDatabase class, a SystemTree class, a Query class, and a PropertyQuery class. In such an embodiment, the second set of classes may include a SystemEntry class that is a concrete class.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

In a networked computing system which includes network computers that may access a shared system database, some methods are common to more than one application programming interface (API). By way of example, some of the methods associated with a client API and some of the methods associated with a server API are essentially the same. However, the functionality of such "shared" methods are generally maintained separately with respect to the system database. That is, the functionality associated with a single method may be maintained repeatedly on the system database. Maintaining a single method multiple times on the database may be inefficient in terms of allowing for consistency of use and function of the method.

Identifying a core set, or group, of methods that are common to more than one API associated with a system database, and, further, developing an associated core class hierarchy may allow the functionality provided by the class hierarchy to be consistently maintained. In particular, as many methods used for a server API and a client API are effectively the same, developing a "core API" of methods that are common to both the server API and the client API may allow the use of the methods and the functionality of the methods to remain consistent, as well as allowing for system database resources to be efficiently used.

Computing networks which are arranged to support network computers generally use a system database as a central component. In one embodiment, the system may be a Java™ system database (JSD). The JSD generally allows an operating system, system services, applications, and tools to store and retrieve configuration information on a Java™-based platform. Configuration information is arranged to describe, for example, the physical devices that are present in a machine associated with the JSD, the system software services that are installed, and the specific user and group application profile. The JSD effectively serves as a central repository to store, as well as access, substantially any information which is used for configuration purposes. Hence, using the JSD, applications and services may implement varied configurations.

Figure 1:
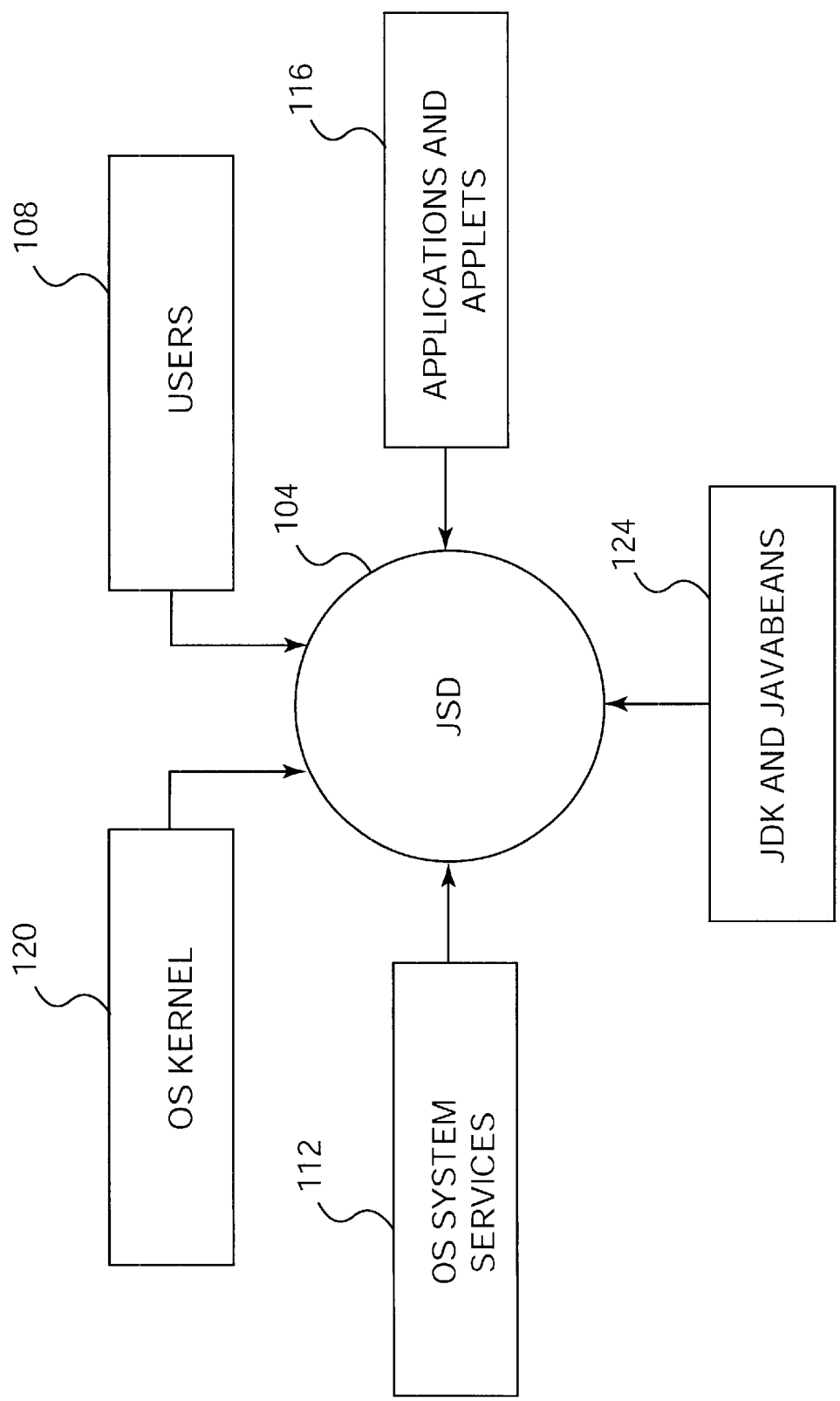
FIG. 1 is a diagrammatic representation of relationships associated with a system database in accordance with an embodiment of the present invention.

FIG. 1 is a diagrammatic representation of relationships associated with a system database in accordance with an embodiment of the present invention. A system database 104, e.g., a JSD, generally provides services to clients or, more specifically, users 108. In other words, within a client-server environment, system database 104 effectively serves as a client-side configuration and communications hub. System database 104 serves as a central database in a network of computing systems with an associated core API of the present invention typically includes a hierarchy of entries, each of which is effectively an atomic unit of information that is identified by a path name. An entry in system database 104 may have one or more associated properties, which are arranged to provide descriptions of the entries. In general, entries on system database 104 may be stored in trees.

System database 104 provides users 108 with services which may include, but are not limited to, information storage, information retrieval, and information publishing. Specifically, system database 104 typically allows users 108 to store, retrieve, and publish information relating to the configurations associated with users 108.

Configurations, or configuration information, often includes information that describes devices or, more specifically, device drivers, which are effectively in communication with system database 104. Such devices are generally associated with machines and users 108. Configuration information may also include descriptions of system services, e.g., operating system (OS) system services 112, that are available through system database 104. In some embodiments, configuration information further describes selected group and user attributes, as well as substantially any necessary application-specific information that is associated with software applications 116 which are available to users 108 through system database 104. It should be appreciated that applications 116 may include applets, such as those written in the Java™ programming language developed by Sun Microsystems, Inc., of Palo Alto, Calif.

In addition to being in communication with users 108, system services 112, and applications 116, system database 104 is also generally associated with an OS kernel 120. In the embodiment as shown, since system database 104 is a JSD, system database 104 is also associated with Java specific software including, for example, a Java OS, a Java Development Kit (JDK) and JavaBeans™. A JDK is a software development and execution environment, available commercially from Sun Microsystems, Inc., that may be used to write applications and applets in the Java programming language. JavaBeans™ are a portable, platform-independent reusable component model created in the Java programming language.

Figure 2:
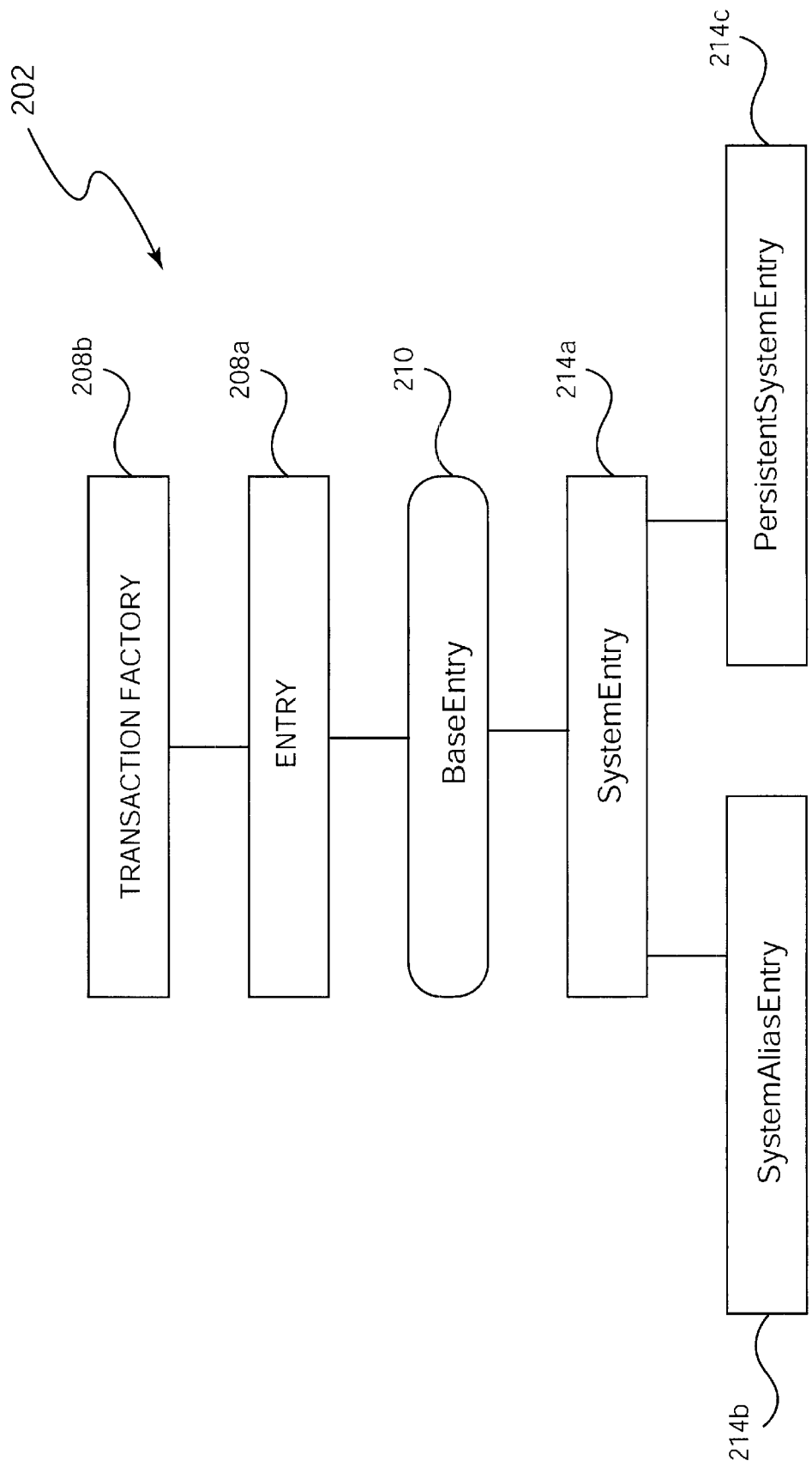
FIG. 2 i s a diagrammatic representation of an interface and class hierarchy which may be used to implement entries within a system database in accordance with an embodiment of the present invention.

Referring next to FIG. 2, an interface and class hierarchy which may be used to implement entries with respect to a system database will be described in accordance with an embodiment of the present invention. An entry class hierarchy 202 includes interfaces 208, an abstract class 210, and concrete classes 214. In one embodiment, entry class hierarchy 202 defines a public API. Interfaces 208, as for example those in a Java environment, are a group of methods which may be implemented by several classes. In general, the classes which may implement the group of methods in interfaces 208 may be located substantially anywhere within an overall class hierarchy, as for example in an abstract class 210 such as a BaseEntry class. Abstract class 210 is a class which contains one or more abstract methods. Abstract methods are typically methods which have no associated implementation and, hence, may not be instantiated. Abstract class 210 is often defined such that other classes may extend abstract class 210, and effectively make them "concrete" by implementing the abstract methods defined within abstract class 210. Concrete classes 214 are classes which may be instantiated and be inserted into the system database. Further, concrete classes 214 are typically arranged such that concrete classes 214 may extend abstract class 210.

In the described embodiment, abstract class 210 is a BaseEntry class. BaseEntry class 210 provides a public API implementation. As a result, BaseEntry class 210 enables a variety of tasks to be effectively centralized. By way of example, BaseEntry class 210 may allow tasks such as the creating of a transaction, the use of a transaction, and security to be centralized. BaseEntry class 210 also effectively implements an entry public API that may be accessed by a user, which is defined by an Entry interface 208a and a TransactionFactory interface 208b. In addition to implementing the entry public API, it should be appreciated that BaseEntry class 210 may also define additional APIs.

Although methods associated with BaseEntry class 210 may generally be varied, BaseEntry class 210 may include methods which obtain and return locks to entries in the system database as necessary. BaseEntry class 210 may further include methods that commit operations and abort operations. It should be appreciated that although methods are effectively defined by BaseEntry class 210, the methods are invoked by other components associated with the system database, or directly by an application.

The public API implementation of insert methods, which are associated with BaseEntry class 210, is intended to substantially allow for the insertion of "children" that are derived from BaseEntry class 210. As a result, the entries published in the associated system database, as for example by a client or a user, are generally of a known heritage, or interface. Knowing the origin of substantially all entries in the system database, including those published by a client, enhances the robustness and security of the system database.

Each entry to a system database has entry attributes. While the entry attributes may vary, BaseEntry class 210 generally supports attributes relating to the name of an entry, the state of an entry, the parent of an entry, the children of an entry, the lock associated with the entry, the manager associated with the entry, and the generation number associated with the entry. In the described embodiment, the name of an entry is substantially a unique name, i.e., the name is unique among all siblings of the parent under which the entry resides.

The state of an entry generally refers to the states the entry may enter during the lifetime of the entry. Typically, an entry may enter three different states, namely a drafted state, a published state, and a deleted state. A drafted state exists when the entry is outside the bounds of a database, but within an associated object heap. In other words, a drafted state exists when an entry is created, but not inserted in a database. A published state refers to the state of the entry after the entry has been inserted into a database under a published parent. Once the entry is established within the database, the entry may then be located by an application or a system service using the name of the entry, or its properties, as searching criteria. A deleted state refers to the state of the entry when the entry is removed from the system database.

The attribute which is the parent of an entry is effectively a reference to the parent entry, while the attribute that is the child of an entry is a reference to at least one of the children of the entry. Substantially all entries have a single parent entry, with the exception of the super root of the system database, which is its own parent. It should be appreciated that when an entry is in a published state, the parent of the entry is non-null, while when an entry is in a drafted state, the parent of the entry may be null. When the parent of an entry is null, the indication is that the entry is the subtree root of a hierarchy of drafted entries.

The lock associated with an entry is typically a read-write lock that is intended to allow the entry to be inspected or modified without interference. Locks may be either shared locks or exclusive locks. That is, locks may be acquired for either shared or exclusive access. The manager associated with an entry is arranged to "set policy" for the entry, as the manager may perform security checks or otherwise affect the behavior of the entry.

The entry generation number is used to indicate whether the entry has been changed. In one embodiment, the entry generation number is a monotonically increasing number, e.g., a 32-bit number, that is incremented whenever the associated entry is modified in any way. As will be appreciated by those skilled in the art, modifying, or changing, an entry may be an insertion, a disconnection, or a removal of the entry within the database. A modification may also include any property additions, changes, or deletions.

A SystemEntry class 214a is a concrete class that is associated with, e.g., a subclass of, BaseEntry class 210. SystemEntry class 214a includes methods associated with the implementation of methods that allow for the manipulation of properties associated with entries.

SystemEntry class 214a is associated with a SystemAliasEntry class 214b and a PersistentSystemEntry class 214c. Entries associated with SystemAliasEntry class 214b are generally used to reference other entries. That is, entries associated with SystemAliasEntry class 214b are aliased entries. It should be appreciated that multiple aliases may refer to a single entry. PersistentSystemEntry class 214c contains methods associated with manipulating properties associated with persistent entries. Additionally, PersistentSystemEntry class 214c may also include methods associated with communicating with a server.

As previously mentioned, BaseEntry class 210 effectively implements an entry public API for operating on entries in the system database, as defined by Entry interface 208a and TransactionFactory interface 208b. TransactionFactory interface 208b defines the service that is used to create transaction objects. Entry interface 208a is arranged to extend TransactionFactory interface 208b. In other words, the methods associated with Entry interface 208a essentially add to the methods of TransactionFactory interface 208b. Hence, the methods associated with TransactionFactory interface 208b typically to specific entries.

In general, methods defined in TransactionFactory interface 208b, which are implemented by BaseEntry class 210, may vary widely. Methods include, but are not limited to, methods that create a shared transaction, and methods that create an exclusive transaction. Additionally, methods may include methods that determine modes of locks that are acquired on an entry, e.g., methods may determine whether a lock is shared or exclusive.

Entry interface 208a is arranged such that each entry in a system database supports effectively all methods associated with Entry interface 208a, as implemented by BaseEntry class 210. A getName( ) method associated with Entry interface 208a is arranged to return the name of an entry. An isDrafted( ) method is arranged to indicate whether or not an entry is drafted, an isPublished( ) method is arranged to indicate whether an entry is published, and an isDeleted( ) method is arranged to indicate whether an entry is deleted. Entry interface 208a is also associated with methods which return information regarding persistence, current generations, parents, children, and, more generally, properties associated with an entry.

An isPersistent( ) method returns an indicator as to whether a particular entry is a persistent, e.g., non-volatile, entry or a transient, e.g., volatile, entry. Methods associated with Entry interface 208a that return information regarding current generations include getGeneration methods which return the current generation of an entry. Methods which relate to the parents of entries include getParent methods that may be used to return the parent of a particular entry.

The methods which are associated with Entry interface 208a and return information related to the children of an entry include getChildEntries methods that return an enumeration that is used to obtain references to the children of a given entry. An enumeration is a class which may be used to provide a list of information. Other methods that return information related to the children of an entry include getChildCount methods which return the number of children for a given entry, insert methods which are arranged to insert a specified entry as a child of another specified entry, disconnect methods which are arranged to disconnect a specified child entry from another specified entry, and remove methods which are arranged to remove a specified child entry.

Typically, the methods which are associated with properties may include getPropertyCount methods which count the number of properties defined for a specified entry, getPropertyNames methods which effectively obtain names for substantially all currently defined properties getPropertyValue methods which obtain property values for an entry, addProperty methods which add or change the value of a specified property, and removeProperty methods which remove specified properties from an entry. It should be appreciated that a method such as a getPropertyNames method may obtain names through an enumeration.

Figure 3A:
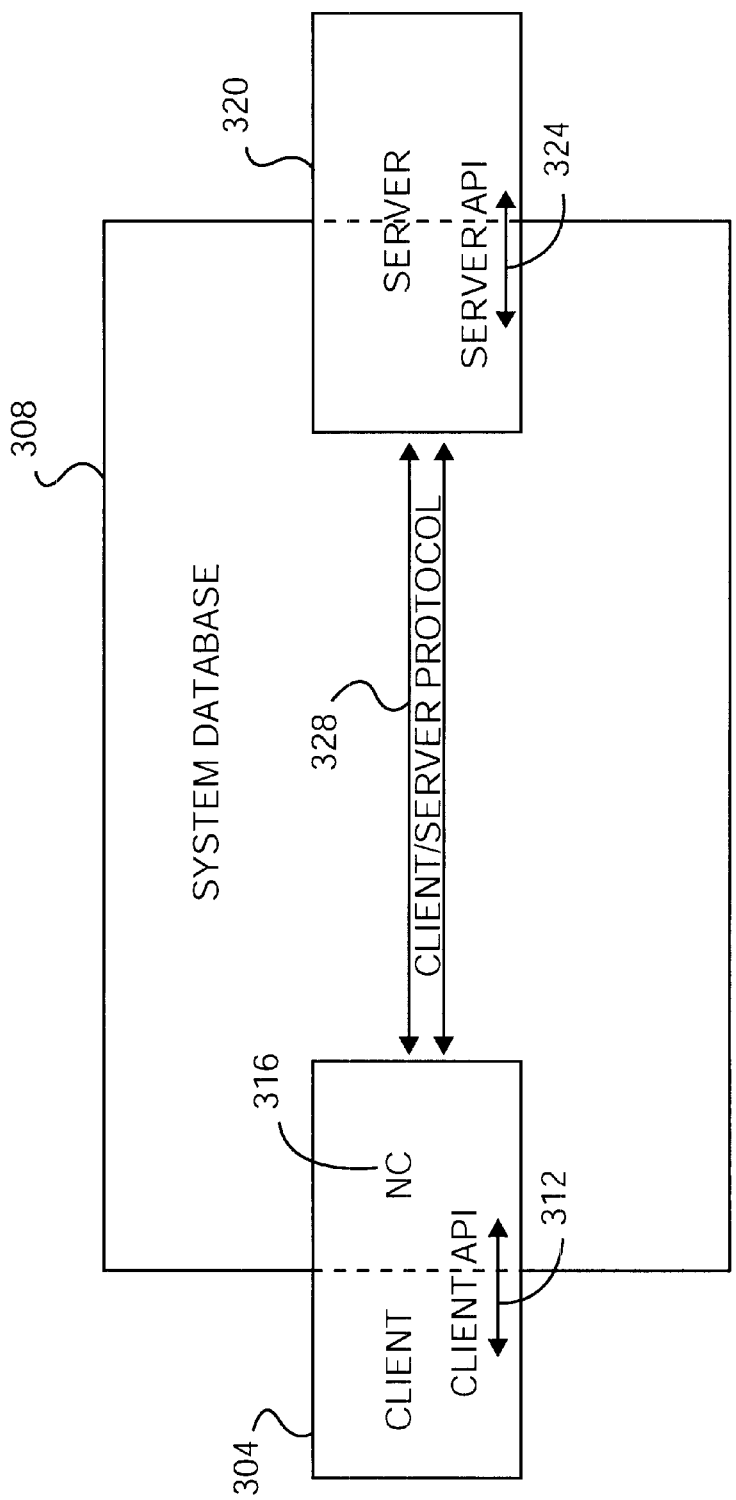
FIG. 3a is a diagrammatic representation of the interactions between a client, a server, and a system database in accordance with an embodiment of the present invention.

In a system which includes a system database, a client and a server are typically in communication with a system database through APIs. FIG. 3a is a diagrammatic representation of the interactions between a client, a server, and a system database in accordance with an embodiment of the present invention. When a client 304 wishes to publish an entry onto a system database 308, client 304 interfaces with a client API 312 to publish the entry using a network computer (NC) 316. The application is published on system database 308 which, in the described embodiment, is a JSD, although it should be appreciated that system database 308 may generally be any suitable database. Client API 312 is also used by client 304 to retrieve or modify applications or, more generally, entries on system database 308. Similarly, when a server 320 is to publish such entries as management information or administrative information on system database 308, server 320 uses a server API 324 to publish the information. Server 320 also interfaces with server API 324 to retrieve or modify entries on system database 308.

Although system database 308 has been shown as being a single, shared entity, in one embodiment, system database 308 may be such that there is a representation of system database 308 associated with client 304, and a representation of system database 308 associated with server 320. That is, client 304 and server 320 may each include a system database representation. For an overall system in which client 304 and server 320 include separate system database representations, e.g., separate JSDs, the representation on client 304 may be the same as the representation on server 320.

In general, when client 304 and server 320 communicate with one another through system database 308, the communication is performed using a client/server protocol 328. Hence, when client 304 provides an entry to server 320, client 304 uses client API 312 to effectively provide the entry to system database 308. Then, using client/server protocol 328, the entry is provided to server API 324 for transfer to server 320.

Figure 3B:
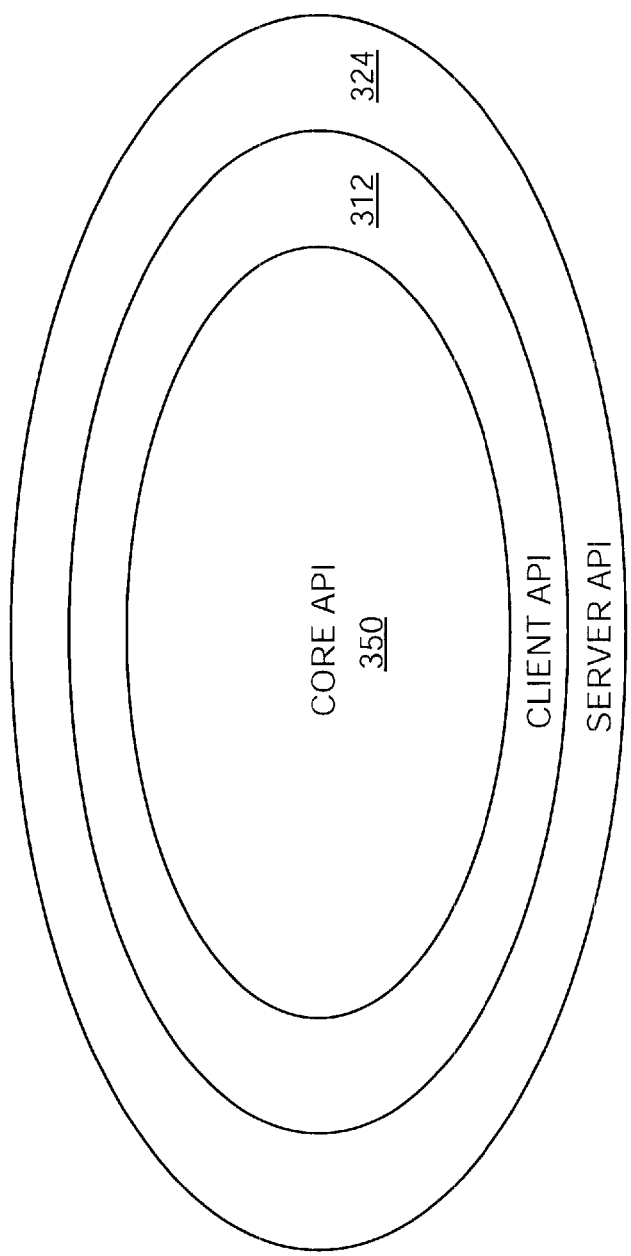
FIG. 3b is a diagrammatic representation of a relationship between a server application programming interface, a client application programming interface, and a core application programming interface in accordance with an embodiment of the present invention.

As mentioned above, many of the interfaces and classes associated with client API 312 are substantially the same as the interfaces and classes associated with server API 324. FIG. 3b is a diagrammatic representation of the relationship between client API 312 and server API 324 in accordance with an embodiment of the present invention. As shown, client API 312 is effectively a subset of server API 324. In other words, server API 324 includes substantially all interfaces and classes which are included in client API 312. Hence, server API 324 includes substantially all methods associated with the interfaces and classes of client API 312.

A core API 350 is defined within both client API 312 and server API 324. That is, client API 312 and server API 324 are supersets of core API 350. The interfaces and classes included in core API 350 will be described below with reference to FIG. 4. In one embodiment, core API 350 may be defined as including interfaces and classes which are publicly accessible. That is, core API 350 may be a public API that includes methods and operations that are publicly available.

Figure 4:
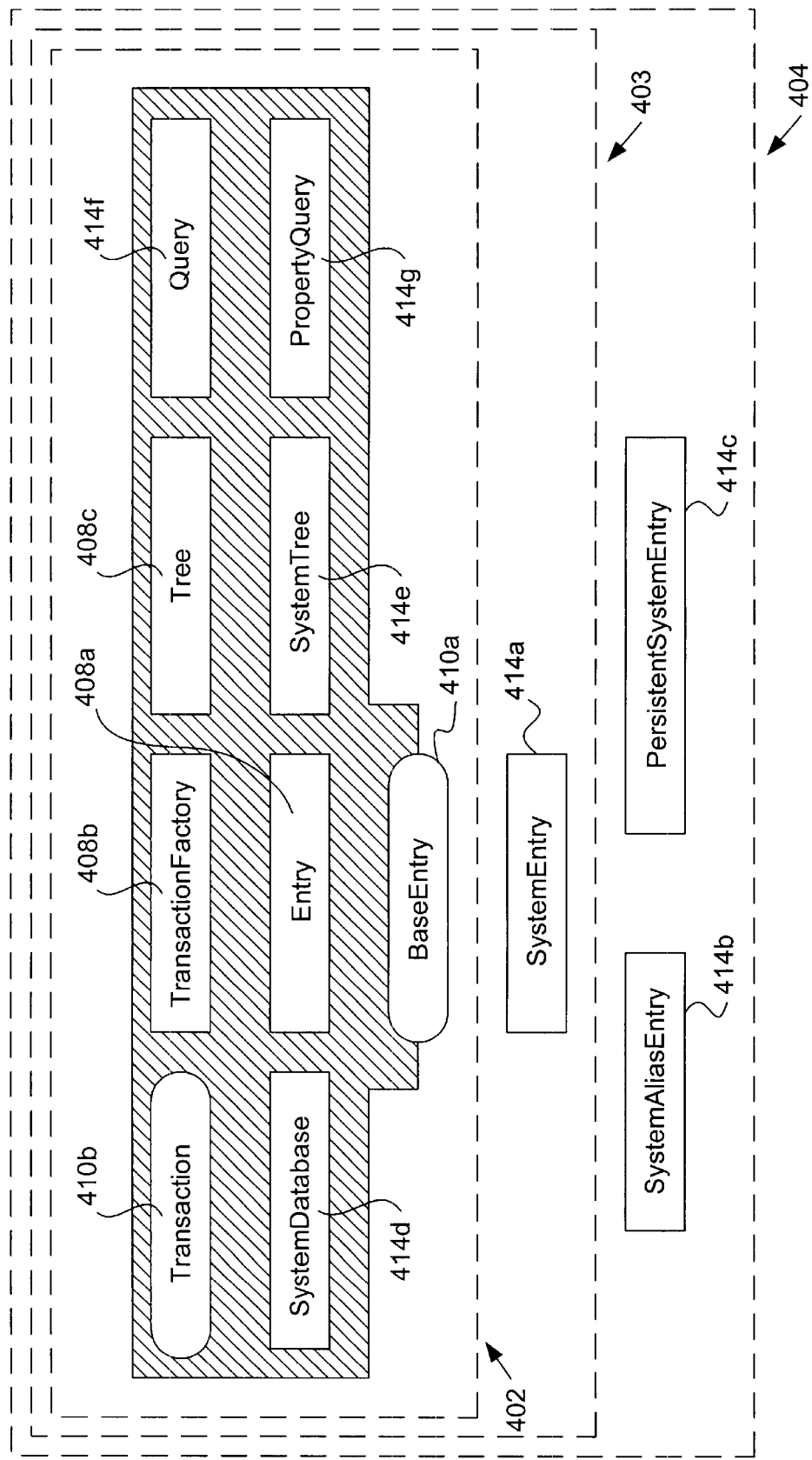
FIG. 4 is a diagrammatic representation of class relationships associated with a core application programming interface in accordance with an embodiment of the present invention.

With reference to FIG. 4, the class relationships associated with a core API will be described in accordance with an embodiment of the present invention. A core API 402 generally includes interfaces 408, abstract classes 410, and concrete classes 414. Interfaces 408, abstract classes 410, and concrete classes 414 were described above with respect to FIG. 2. Interfaces 408 within core API 402 include an Entry interface 408a, a TransactionFactory interface 408b, and a Tree interface 408c. Abstract classes 410 within core API 402 include a BaseEntry class 410a and a Transaction class 410b, while concrete classes 414 within core API 402 include a SystemDatabase class 414d, a SystemTree class 414e, a Query class 414f, and a PropertyQuery class 414g.

A client API 403 includes substantially all methods associated with core API 402, as well as all methods associated with a SystemEntry class 414a, which was described above with respect to FIG. 2. It should be appreciated, however, that in some embodiments, client API 403 may be the same as core API 402. That is, client API 403 may include only the methods defined in core API 402. In the described embodiment, a server API 404 includes the methods of client API 403, in addition to the methods of a SystemAliasEntry class 414b and a PersistentSystemEntry class 414c. SystemAliasEntry class 414b and PersistentSystemEntry class 414c were previously discussed with reference to FIG. 2.

Entry interface 408a and TransactionFactory interface 408b essentially define a public API. Specifically, Entry interface 408a and TransactionFactory interface 408b define the public API, while BaseEntry class 410a, SystemEntry class 414a, SystemAliasEntry class 414b, and PersistentSysterEntry class 414c may effectively be published externally and are, in effect, visible to the public. Tree interface 408c defines an interface which allows trees within a system database to be manipulated. While methods included in Tree interface 408c may vary, the methods often include such methods as a getRootEntry( ) method that returns the root entry of a specified tree, a getCurrentEntry( ) method that returns the current entry for the specified tree, and a setCurrentEntry method that sets the current entry for the specified tree.

Methods associated with Tree interface 408c further include "find" methods and "create" methods, in addition to various printing methods. Find methods generally include, but are not limited to, findEntry methods that are arranged to find an entry based on a specified path name and findDeepestEntry methods that are arranged to find the deepest existing entry of a specified path name. Create methods may include newAlias methods which are arranged to create a new alias with a specified path name, and newEntry methods that are arranged to create new entries, e.g., new system entries, using either the specified path name or a provided new name.

BaseEntry class 410a, which is an abstract class, implements a public API as previously described. Core API 402 also includes Transaction class 410b, which is an abstract class. Transaction class 410b generally includes methods and constructors which are related to transactions performed on a system database. In one embodiment, transaction class 410b includes an is Valid( ) method, a getOwnerID( ) method, a commit( ) method, and an abort( ) method. The is Valid( ) method is arranged to indicate whether or not a transaction is valid. A valid transaction is considered to be a transaction that has not yet been committed or aborted, as will be appreciated by those skilled in the art. The getOwnerID( ) method is arranged to return an identifier associated with the thread that created a particular transaction. The commit( ) method effectively commits a transaction such that substantially all associated changes to the system database are made visible, relevant events are produced, and held locks are released. Finally, the abort( ) method is arranged to abort a transaction and, hence, both "rolls back" any changes which were made by the transaction and releases any held locks.

Core API 402 includes a variety of different concrete classes. SystemDatabase class 414d includes methods which are used to initialize and to return information associated with the system database. By way of example, SystemDatabase class 414d may include a SystemDatabase( ) class which is arranged to initialize the system database, a getSuperRootEntry( ) method that is arranged to return the entry reference of a super root associated with the system database, and a getSystemDatabase( ) method that is arranged to return a tree that defines the system database. SystemTree class 414e is arranged to implement methods defined by Tree interface 408c. That is, SystemTree class 414 implements methods including, but not limited to, a getRootEntry( ) method that returns the root entry of a specified tree, a getCurrentEntry( ) method that returns the current entry for the specified tree, and a setCurrentEntry method that sets the current entry for the specified tree, as well as those previously described.

In one embodiment, Query class 414f includes methods which are used to perform searches with respect to the system database. By way of example, Query class 414f may generally include methods which query a root to determine all entries that match a specified scope. Query class 414f may also include a setSearchScope( ) method which is arranged to change the scope of a search, a getSearchScope( ) method which is arranged to obtain the scope of a search, a getSearchName( ) method which is arranged to provide the entry name used in a search, a previousMatch( ) method which resets a query to the last match, and a getCurrentMatch( ) method which is arranged to return the current match, as well as numerous other methods. The other methods may include, but are not limited to, methods associated with returning results of different matches, e.g., the results of a previous match or the next match.

PropertyQuery class 414g is an extension of Query class 414f. In other words, the methods in PropertyQuery class 414f may effectively override the methods of Query class 414f. Methods contained in PropertyQuery class 414g are typically arranged to provide search capabilities based upon entry property names. Specifically, the methods may include methods that are intended to search for any entries with a given property name within a specified scope.

Figure 5:
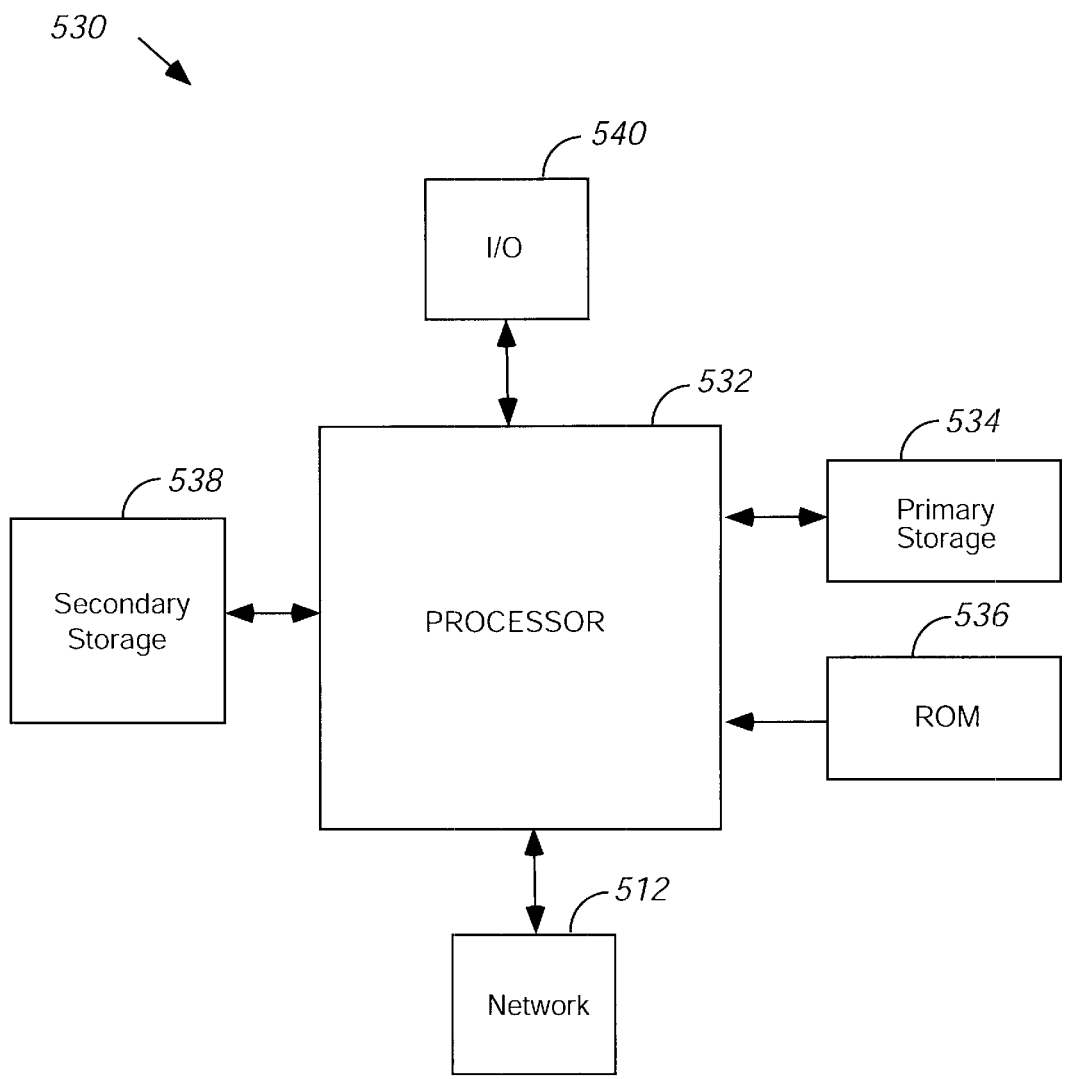
FIG. 5 is a diagrammatic representation of a computer system suitable for implementing the present invention.

FIG. 5 illustrates a typical, general-purpose computer system suitable for implementing the present invention. A computer system 530 includes at least one processor 532, also referred to as a central processing unit (CPU), that is coupled to memory devices. Processor 532 may be part of a network computer, e.g., processor 532 may be in communication with a network computer. The memory devices may generally include primary storage devices 534, such as a read only memory (ROM), and primary storage devices 536, such as a random access memory (RAM).

As is well known in the art, ROM 534 acts to transfer data and instructions uni-directionally to CPU 532, while RAM 536 is used typically to transfer data and instructions to and from CPU 532 in a bi-directional manner. Both primary storage devices 534, 536 may include substantially any suitable computer-readable media. A secondary storage medium 538, which is typically a mass memory device, may also be coupled bi-directionally to CPU 532. In general, secondary storage medium 538 is arranged to provide additional data storage capacity, and may be a computer-readable medium that is used to store programs including computer code, computer program code devices, data, and the like. In one embodiment, secondary storage medium 538 may be a system database which is shared by multiple computer systems. Typically, secondary storage medium 538 is a storage medium such as a hard disk or a tape which may be slower than primary storage devices 534, 536. Secondary storage medium 538 may take the form of a well-know device including, but not limited to, magnetic and paper tape readers. As will be appreciated by those skilled in the art, the information retained within secondary storage medium 538, may, in appropriate cases, be incorporated in a standard fashion as part of RAM 536, e.g., as virtual memory. A specific primary storage device 534 such as a CD-ROM may also pass data uni-directionally to CPU 532.

CPU 532 is also coupled to one or more input/output devices 540 that may include, but are not limited to, video monitors, track balls, mice, keyboards, microphones, touch-sensitive displays, transducer card readers, magnetic or paper tape readers, tablets, styluses, voice or handwriting recognizers, as well as other well-known input devices, such as other computers. Finally, CPU 532 may be coupled to a computer or a telecommunications network, e.g., an internet network or an intranet network, using a network connection as shown generally at 512. With such a network connection 512, it is contemplated that the CPU 532 may receive information from a network. CPU 532 may also output information to the network. Such information, which is often represented as a sequence of instructions to be executed using CPU 532, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the client API may not necessarily be a "subset" of a server API. In some embodiments, a client API and a server API may overlap to define a core API, in lieu of a server API which includes all classes and interfaces associated with a client API. In other embodiments, the client API and the core API may be the same, i.e., all interfaces and classes in the client API may also be included in the core API.

As previously mentioned, a core API may be a public API. By way of example, referring back to FIG. 4, in one embodiment, a public API may include all interfaces and classes in core API 402, with the exception of BaseEntry class 410a. In another embodiment, as a client API may include only the classes and interfaces in a core API, i.e., the client API may be equivalent to the core API, the client API may effectively be a public API. Alternatively, a core API may include a protected API. The protected API may be considered to be a private API, as the associated methods are generally not visible externally.

While the relationship between a core API, a client API, and a server API has been described as having a server API which is a superset of a client API that is a superset of a core API, the relationship may vary without departing from the spirit or the scope of the present invention. For instance, a server API may not necessarily be a superset of the client API. That is, while the server API and the client API may both include a core API, the server API may not necessarily encompass the entire client API. Instead, the server API may encompass only a few of the classes or interfaces of the client API which are not included in the core API. Alternatively, the server API may include none of the classes of interfaces of the client API which are not already included in the core API.

The class hierarchy associated with a core API may generally vary. For instance, the class hierarchy may vary for embodiments in which there are either fewer or more classes associated with APIs. Similarly, the classes, as well as the methods, associated with different APIs may vary depending upon the requirements of a particular system without departing from the spirit or the scope of the present invention.

While arguments to methods, as for example entry interface methods and tree interface methods, have generally been described in terms pertaining to a specified entry it should be appreciated that the arguments used in the various methods described above with respect to FIGS. 2 and 4 may be widely varied. Some methods may take a specified transaction as an argument, while others may effectively create an anonymous transaction on behalf of the caller. Further, some methods may not take any arguments. Therefore, the present examples are to be considered as illustrative and not restrictive, and the invention is not to be limited to the details given herein, but may be modified within the scope of the appended claims.

What is claimed is:

1. A class structure in an object based system, the class structure being arranged to provide application programming interfaces which enable access to a system database, the class structure comprising:

a first set of classes, the first set of classes being arranged to define a core application programming interface, wherein the first set of classes includes at least one public interface;

a second set of classes, the second set of classes including the first set of classes, wherein the second set of classes is arranged to define a client application programming interface associated with a client, the client being in communication with the system database; and a third set of classes, the third set of classes including the second set of classes, wherein the third set of classes is arranged to define a server application programming interface associated with a server, the server being in communication with the system database.

2. A class structure as recited in claim 1 wherein the at least one interface includes an Entry interface.

3. A class structure as recited in claim 1 wherein the first set of classes includes at least one abstract class and at least one concrete class.

4. A class structure as recited in claim 3 wherein the at least one abstract class includes a BaseEntry class, and the at least one concrete class includes a SystemDatabase class, a Query class, and a PropertyQuery class.

5. A class structure as recited in claim 4 wherein the second set of classes includes a SystemEntry class, the SystemEntry class being a concrete class.

6. A class structure as recited in claim 5 wherein the third set of classes includes a SystemAliasEntry class and a PersistentSystemEntry class, wherein the SystemAliasEntry class and the PersistentSystemEntry class are concrete classes.

7. A class structure as recited in claim 1 wherein the core application programming interface is a public application programming interface.

8. A class structure in an object based system, the class structure being arranged to provide application programming interfaces which enable access to a system database, the system database being associated with the object based system, the class structure comprising:

a client application programming interface, the client application programming interface including a hierarchy of classes and interfaces, the client application programming interface being associated with a client that is in communication with the system database, wherein the client application programming interface is a public application programming interface, the public application programming interface including public methods and public interfaces; and a server application programming interface, the server application programming interface including the client application programming interface, the server application programming interface being associated with a server that is in communication with the system database, the server further being in communication with the client.

9. A class structure as recited in claim 8 wherein the system database is a Java system database.

10. A class structure as recited in claim 8 wherein the server application programming interface includes at least one class that is not included in the hierarchy of classes and interfaces associated with the client application programming interface.

11. A computer program product for providing application programming interfaces in an object based computing system, the application programming interfaces being arranged to access a system database associated with the object based computing system, the computer program product comprising:

computer code that defines a first set of classes, the first set of classes being arranged to define a core application programming interface, wherein the first set of classes includes at least one public interface;

computer code that defines a second set of classes, the second set of classes being arranged to include the first set of classes, wherein the second set of classes is further arranged to define a client application programming interface associated with a client, the client being in communication with the system database;

computer code that defines a third set of classes, the third set of classes being arranged to include the second set of classes, wherein the third set of classes is further arranged to define a server application programming interface associated with a server, the server being in communication with the system database; and a computer readable medium that stores the computer codes.

12. A computer program product according to claim 11 wherein the computer readable medium is one selected from the group consisting of a data signal embodied in a carrier wave, a computer disk, a CD-ROM, a tape, a flash memory, a system memory, and a computer hard drive.

13. A computer program product according to claim 11 wherein the at least one public interface includes an Entry interface.

14. A computer program product according to claim 11 wherein the computer code that defines the first set of classes includes computer code that defines at least one abstract class and at least one concrete class.

15. A computer program product according to claim 14 wherein the computer code that defines the at least one abstract class includes computer code that defines a BaseEntry class, and the computer code that defines the at least one concrete class includes computer code that defines a SystemDatabase class, a Query class, and a PropertyQuery class.

16. A computer program product according to claim 15 wherein the core application programming interface is a public application programming interface.

17. A computer program product according to claim 11 wherein the system database is a Java System database.

* * * * *